United States Patent
Quere et al.

(10) Patent No.: US 10,057,634 B2
(45) Date of Patent: Aug. 21, 2018

(54) METHOD FOR FAST CHANNEL CHANGE AND CORRESPONDING DEVICE

(71) Applicant: THOMSON LICENSING, Issy les Moulineaux (FR)

(72) Inventors: Theirry Quere, Montfort sur Meu (FR); Renaud Rigal, Cesson-Sevigne (FR); Nicolas Debomy, Longaulnay (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/294,771

(22) Filed: Oct. 16, 2016

(65) Prior Publication Data
US 2017/0111686 A1 Apr. 20, 2017

(30) Foreign Application Priority Data
Oct. 19, 2015 (EP) .................... 15306668

(51) Int. Cl.
| | |
|---|---|
| H04N 7/173 | (2011.01) |
| H04N 7/16 | (2011.01) |
| H04N 21/438 | (2011.01) |
| H04L 29/06 | (2006.01) |
| H04N 21/643 | (2011.01) |
| H04N 21/43 | (2011.01) |
| H04N 21/8547 | (2011.01) |
| H04N 21/242 | (2011.01) |
| H04N 21/2385 | (2011.01) |
| H04N 21/266 | (2011.01) |

(Continued)

(52) U.S. Cl.
CPC ......... *H04N 21/4384* (2013.01); *H04L 65/60* (2013.01); *H04N 21/2385* (2013.01); *H04N 21/242* (2013.01); *H04N 21/2408* (2013.01); *H04N 21/26616* (2013.01); *H04N 21/4305* (2013.01); *H04N 21/4307* (2013.01); *H04N 21/4341* (2013.01); *H04N 21/44209* (2013.01); *H04N 21/64322* (2013.01); *H04N 21/8547* (2013.01)

(58) Field of Classification Search
None
See application file for complete search history.

(56) References Cited

U.S. PATENT DOCUMENTS

| | | | |
|---|---|---|---|
| 6,148,135 A | 11/2000 | Suzuki | |
| 6,313,879 B1 * | 11/2001 | Kubo | ................. H04N 21/4305 348/423.1 |

(Continued)

FOREIGN PATENT DOCUMENTS

| | | |
|---|---|---|
| EP | 1670525 | 6/2006 |
| WO | WO2004004330 | 1/2004 |

*Primary Examiner* — Fred Peng
(74) *Attorney, Agent, or Firm* — Jerome G. Schaefer

(57) ABSTRACT

In a video delivery environment where a channel change in an audio/video receiver starts with a burst delivery of an audio/video stream to the receiver, characteristics of the audio/video stream are determined such as audio-video drift and burst characteristics in terms of duration of excess data delivery. At least one of these characteristics determines an offset to add to an initialization of a decoder clock, so that moving images are shown as early as possible after receipt of the channel change command, to be joined by lip synchronized audio before burst end.

16 Claims, 7 Drawing Sheets

(51) Int. Cl.
*H04N 21/24* (2011.01)
*H04N 21/434* (2011.01)
*H04N 21/442* (2011.01)

(56) References Cited

U.S. PATENT DOCUMENTS

| | | |
|---|---|---|
| 8,379,151 B2 | 2/2013 | Shenoi |
| 2003/0066094 A1 | 4/2003 | Van Der Schaar et al. |
| 2004/0168203 A1* | 8/2004 | Seo ................. G11B 27/10 725/135 |
| 2006/0146850 A1* | 7/2006 | Virdi ................. H04N 7/18 370/412 |
| 2009/0148131 A1* | 6/2009 | Akgul ............... H04N 21/2368 386/355 |
| 2010/0254673 A1* | 10/2010 | Begen ............... H04N 7/17318 386/239 |
| 2012/0163476 A1* | 6/2012 | Gautier ............. H04N 5/50 375/240.26 |

\* cited by examiner

METHOD FOR FAST CHANNEL CHANGE AND CORRESPONDING DEVICE

1. REFERENCE TO RELATED APPLICATION

This application claims priority from European Application No. 15306668.3, entitled "Method for Fast Channel Change and Corresponding Device," filed on Oct. 19, 2015, the contents of which are hereby incorporated by reference in its entirety.

2. TECHNICAL FIELD

The present disclosure generally relates to the field of the rendering of audio/video services and in particular to fast channel change.

3. TECHNICAL BACKGROUND

While the conversion of analog to digital television was a great leap forward in the transmission and reception of audiovisual content for many reasons such as transmission bandwidth gain and improved picture quality, channel change speed had become significantly slower. This is because the digital receiver executes many tasks before it is ready to show a first image of the new channel. Processing time is notably spent in extraction and buffering of audio and/or video (AV) packets and filling of a receiver buffer with AV packets extracted from a digital transmission before any moving image can be shown and before audio can be rendered in a synchronized manner with the moving images (lip sync). In order to overcome this disadvantage that was felt by many users as a regression, various solutions were developed that are commonly referred to as Fast Channel Change (FCC). One of these solutions to the FCC problem is Internet Protocol (IP) unicast burst transmission of audio/video content before joining a multicast IP stream. A receiver changing channel requests a unicast burst with audio/video contents. As the burst is at a speed faster than playout rate, the receiver can quickly fill its reception buffer with audio/video packets of the new channel and quickly start decoding and rendering, and then switches to reception of audio/video packets from a multicast stream. Moving images are shown when enough audio and video data is received.

There is thus a need for further reduction of channel change delay.

4. SUMMARY

The present disclosure aims at alleviating some of the inconveniences of prior art.

To this end, the present principles comprise a method for fast channel change of an audio/video receiver device receiving an audio/video stream over an Internet Protocol network. The method is implemented by the audio/video receiver device, and in the method comprises: receiving a channel change command; transmitting a request for burst delivery of the audio/video stream corresponding to a new channel; initializing a decoder clock in the audio/video receiver device with a value of a last Program Clock Reference comprised in the burst delivery before receipt of a video Presentation Time Stamp comprised in the burst delivery plus an offset, wherein the offset is a function of a drift between video frames and corresponding audio frames in the burst and of a duration of excess data delivery of the burst delivery defined as a duration of a part of the burst delivery during which data is received in excess compared to a delivery at playout rate; and receiving the audio/video stream at the playout rate after end of the burst delivery.

According to a variant embodiment of the method, the drift is a difference between the video Presentation Time Stamp and the last Program Clock Reference.

According to a variant embodiment of the method, the offset is equal to the drift if the difference is inferior to the duration of excess data delivery of the burst delivery and wherein the offset is the duration of excess data delivery otherwise.

According to a variant embodiment of the method, the method further comprises monitoring the drift between audio and video frames; and if the drift between audio and video frames changes, reinitializing the decoder clock based on the change in drift between audio and video frames.

According to a variant embodiment of the method, the method further comprises monitoring burst characteristics; and if the burst characteristics change, reinitializing the decoder clock based on the changed burst characteristics.

According to a variant embodiment of the method, further comprising monitoring of the drift between audio and video frames and monitoring of burst characteristics, and reinitializing the decoder clock if the drift or the burst characteristics change, based on the changed drift or based on the changed burst characteristics.

According to a variant embodiment of the method, the reinitialization of the decoder clock is done before appearance of moving images are output by the audio/video receiver device.

According to a variant embodiment of the method, the decoder clock is a System Time Clock.

The present disclosure also relates to an audio/video receiver device, comprising a decoder clock initializer configured to initialize a decoder clock of the audio/video receiver device with a value of a last Program Clock Reference received before receipt of a video Presentation Time Stamp plus an offset, wherein the offset is a function of a drift between audio and video frames in a burst delivery and of a duration of excess data delivery of the burst delivery defined as a duration of a part of the burst delivery during which data is received in excess compared to a delivery at playout rate.

According to a variant embodiment, the audio/video receiver device further comprises: an interface configured to receive a channel change command (e.g., from a user via a remote control interface); a network interface configured to transmit a request for burst delivery of audio/video content from a selected audio/video channel; and the network interface being further configured to switch to reception of audio/video content from a transmission at playout rate before end of the burst delivery.

According to a variant embodiment of the audio/video receiver device, the decoder clock initializer is further configured to compute the drift as a difference between the video Presentation Time Stamp and the last Program Clock Reference.

According to a variant embodiment of the audio/video receiver device, the decoder clock initializer is further configured to compute the offset as being equal to the drift if the difference is inferior to the duration of excess data delivery of the burst reception and wherein the offset is the duration of excess data delivery otherwise.

5. LIST OF FIGURES

More advantages of the present principles will appear through the description of particular, non-restricting embodiments of the disclosure. In order to describe the manner in which the advantages of the present principles can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring of the disclosure.

The exemplary embodiments will be described with reference to the following figures.

6. DETAILED DESCRIPTION

Figure 1:
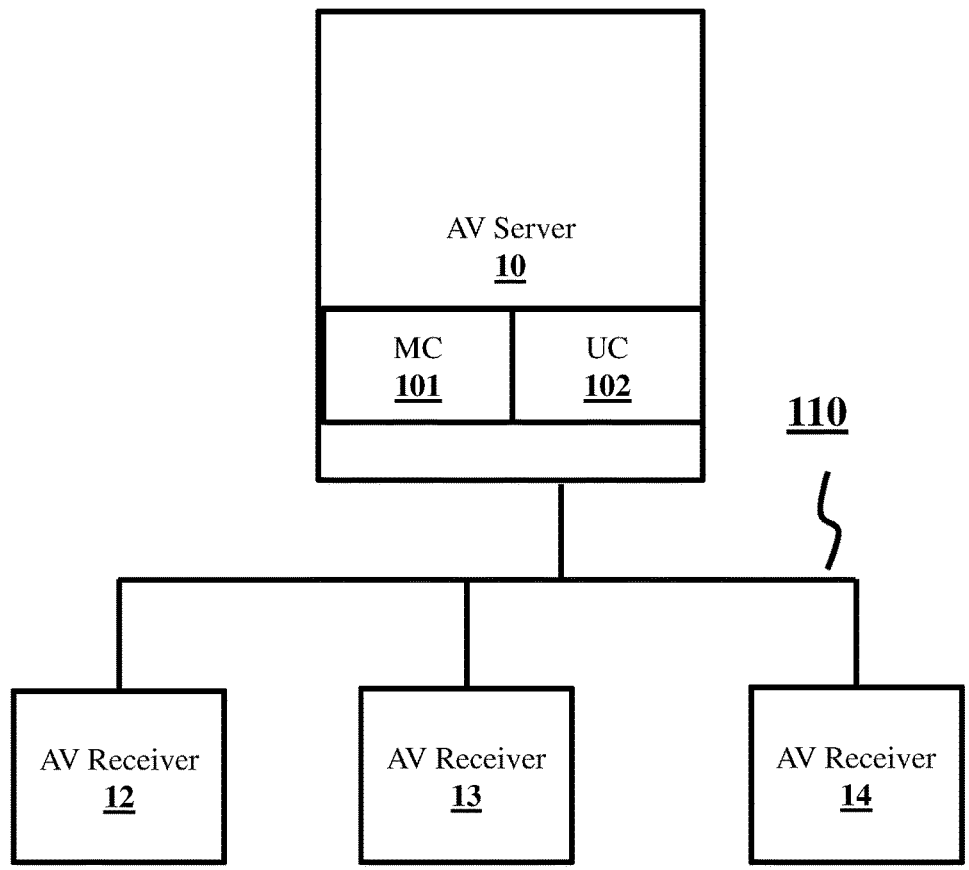
FIG. 1 is an environment for fast channel change based on IP unicast burst transmission.

FIG. 1 is an environment for fast channel change based on IP unicast burst transmission. Several audio/video receivers 12, 13 and 14 are connected to an IP network 110. An audio/video server 10 is connected to IP network 110. Audio/video server 10 comprises an IP multicast module 101 and an IP unicast module 102.

Figure 2:
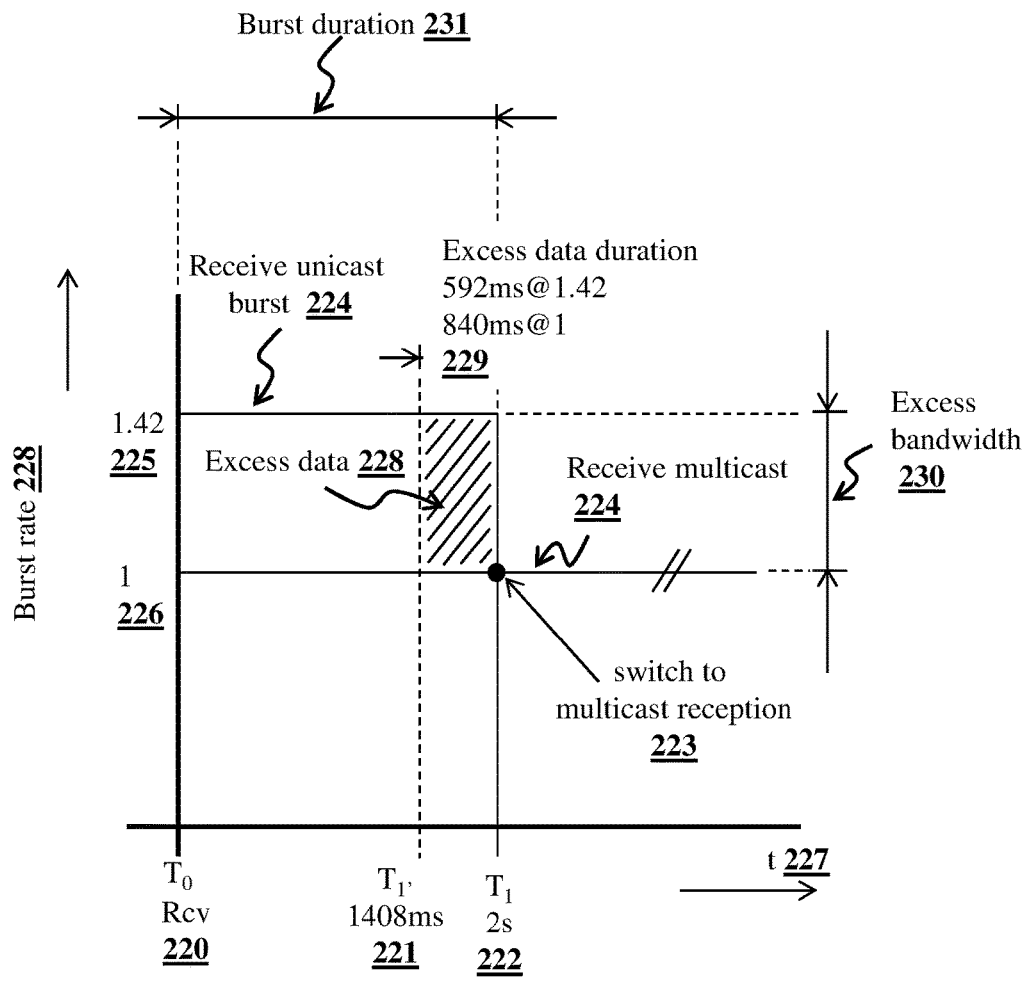
FIG. 2 illustrates IP unicast burst transmission to an AV receiver in parallel with transmission of an AV stream via IP multicast.

FIG. 2 illustrates IP unicast burst transmission from an AV server, such as AV server 10 of FIG. 1, to an IP AV receiver such as AV receiver 12, 13 or 14 of FIG. 1, in parallel with IP multicast transmission of an AV stream corresponding to the same AV content. Plotted on the vertical axis 228 is the burst ratio:

$$\text{burst\_ratio} = \frac{\text{burst\_rate}}{\text{normal\_play\_rate}} \quad (1)$$

E.g. if the burst_rate is 2.84 Mbit/s, and normal_play_rate is 2 Mbit/s, burst_ratio is 1.42. Time is plotted on the horizontal axis 227. The AV receiver requests a unicast burst stream with AV contents corresponding to a requested channel after a channel change command. The IP unicast module 102 in AV server 10 transmits data related to the new channel at a faster than playout rate, here at a burst ratio of 1.42 times the playout rate, reference 225. "Playout rate" means here the normal play rate, i.e. the rate with which the AV contents is played at normal play speed, which we will define here as 1. At $T_0$ with reference 220, AV receiver 12 receives the first data of the requested channel. The faster-than-normal-playrate with which the data is received allows the AV receiver to retrieve in a relatively short period enough data to start rendering moving images with lip sync audio at $T_1$=1500 ms from the channel change command, reference 221. The AV receiver continues to receive AV data from the unicast burst stream 224 until the unicast burst stream transmission 224 stops at $T_1$=2 s, reference 222. Then the AV receiver switches, reference 223, to reception of AV data related to the new channel from the multicast stream 224 that is at playout rate, reference 226. The AV receiver continues to receive AV data from the multicast stream 224 until it changes channel again. It can thus be observed that during the burst duration 231, there is an excess bandwidth 230 taken on the IP network. It can also be observed that the amount of data received during the burst after $T_1$, and until the burst end $T_1$ is in excess of the amount of data that would have been received by the receiver would it have been receiving the multicast instead from $T_0$ to $T_1$. We will refer to this period as the excess data duration, reference 229. The excess data duration is computed as in the equation hereunder:

$$\text{burst\_excess\_data\_duration} = \text{burst\_duration} - \left(\frac{\text{burst\_duration}}{\text{burst\_ratio}}\right) \quad (2)$$

Given a burst ratio of 1.42 and a burst duration of 2000 ms, the burst excess data duration is 592 ms, meaning that in 2000 ms of burst delivery at a rate of 1.42, burst excess data is received for a duration of 592 ms. This corresponds to an excess_data_duration of 840 ms of supplementary data for consumption at playout rate (=burst_excess_data_duration×burst_ratio). In order to compute directly the excess_data_duration for playout rate from the burst ratio and the burst duration, the following equation applies:

excess_data_duration=burst_duration*burst_ratio−burst_duration (3)

We will refer to the amount of data received in excess as excess data, reference 228.

Figure 3:
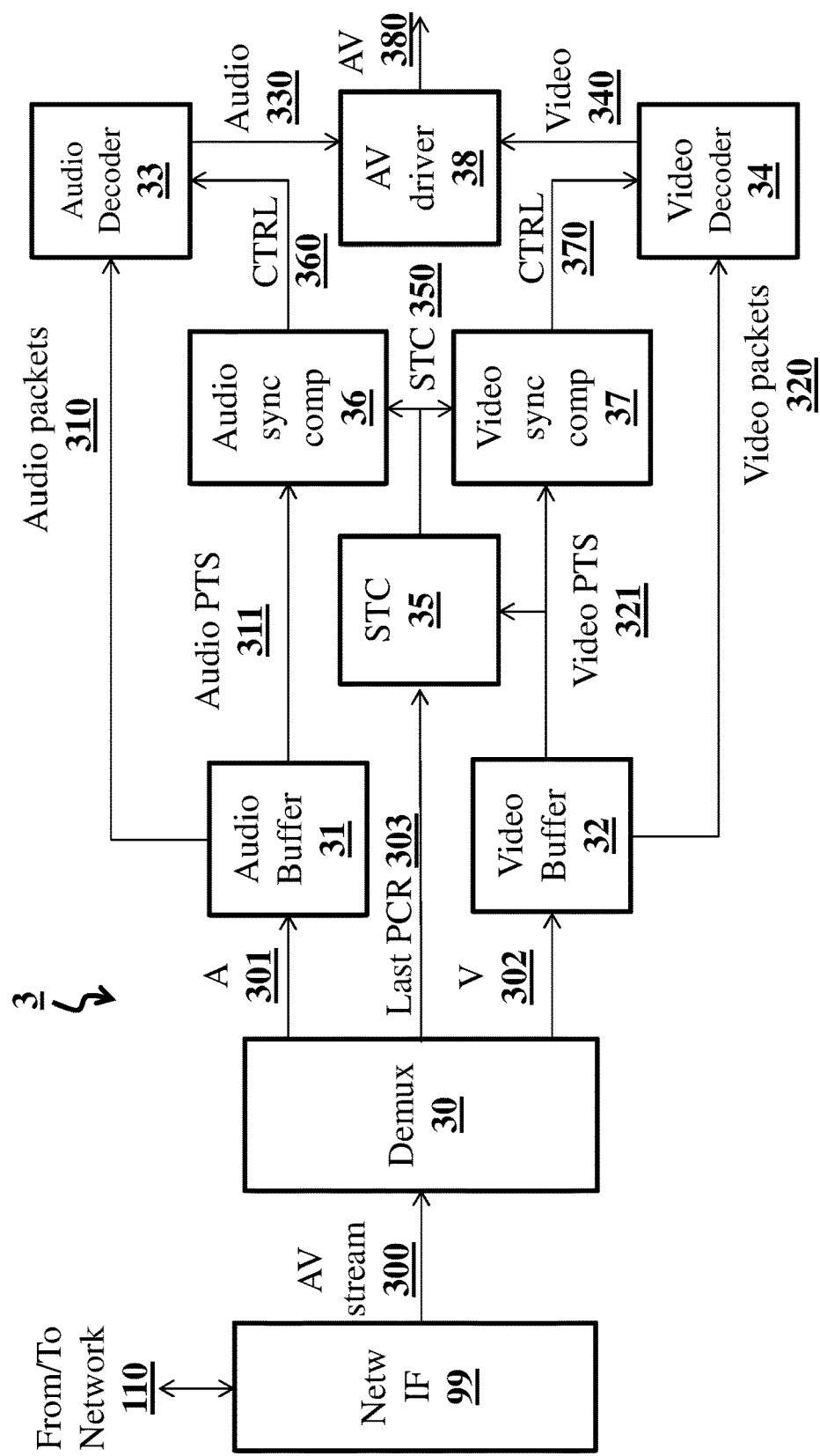
FIG. 3 is a prior technique IP AV receiver.

FIG. 3 is a prior technique IP AV receiver 3, such as comprised in an IP Set-Top Box. The AV receiver of FIG. 3 corresponds for example to one of the AV receivers 12, 13 or 14 of FIG. 1. Via a network interface 99, IP AV receiver 3 receives an AV stream 300 from an AV server (e.g. from server 10 of FIG. 1), that is connected to an IP network (e.g. to IP network 110 of FIG. 1a). AV stream 300 is demultiplexed in a demultiplexer 30 ("demux"), which extracts packets comprised in the AV stream and outputs audio related packets 301 and video related packets 302. Audio packets are fed to audio buffer 31 and video packets are fed to video buffer 32. At the output of the video buffer, video presentation time stamps (PTS) packets are provided to System Time Clock (STC) 35. The STC is a clock that is internal to the receiver 3. It is a counter that is typically incremented with a frequency that is close to the encoder clock (e.g. as used in an encoder in server 10). Program clock reference (PCR) packets comprised in AV streams are used for continuous decoder-encoder synchronization in AV receivers with a front-end, for example a tuner front-end for a satellite- or digital terrestrial television (DTT) reception. Audio and video PTS are timing packets that comprise time stamps values that are related to the PCR, and that indicate at which value of PCR audio or video packets that follow PTS in the AV stream are to be presented (or "rendered"). In IP receivers however PCR packets are used for initial decoder-encoder synchronization but are not used for continuous decoder-encoder synchronization because of technical infeasibility due to transport jitter introduced by the asynchronous character of the IP delivery network. For IP AV receiver 3, in order to synchronize the decoder clock with the encoder clock, the STC is initialized once (e.g. during channel change) with the value of a received PCR 321. STC 35 outputs STC counter values 350. From the audio buffer 31, audio packets 310 are input to audio decoder 33. From the video buffer 32, video packets are input to the video decoder 34. Further from audio buffer 31, audio PTS are input to audio sync comparator 36. Further from video buffer 32, video PTS are input to a video sync comparator 37. The values from the STC 350 are input to an audio sync comparator 36 and to a video sync comparator 37. The audio sync comparator compares the received audio PTS 311 with the STC values 350. If a received audio PTS 311 is equal to an STC value 350, it outputs a control signal 360 to audio decoder 33, which then decodes the next audio packet 310, and which outputs decoded audio 330. For video, this is the same; the video sync comparator 37 compares the received video PTS 321 with the STC values 350. If a received video PTS 321 is equal to an STC value 350, it outputs a control signal 360 to the video decoder 34, which then decodes the next video packet 220, and which then outputs decoded video 340. Finally, an audio/video driver 38 converts, amplifies and adapts audio/video for output on AV output 380. Optionally, the receiver 3 comprises a user interface (not shown) for receiving user commands from for example a tactile screen, a mouse, a keyboard, and/or a remote control device.

Figure 4:
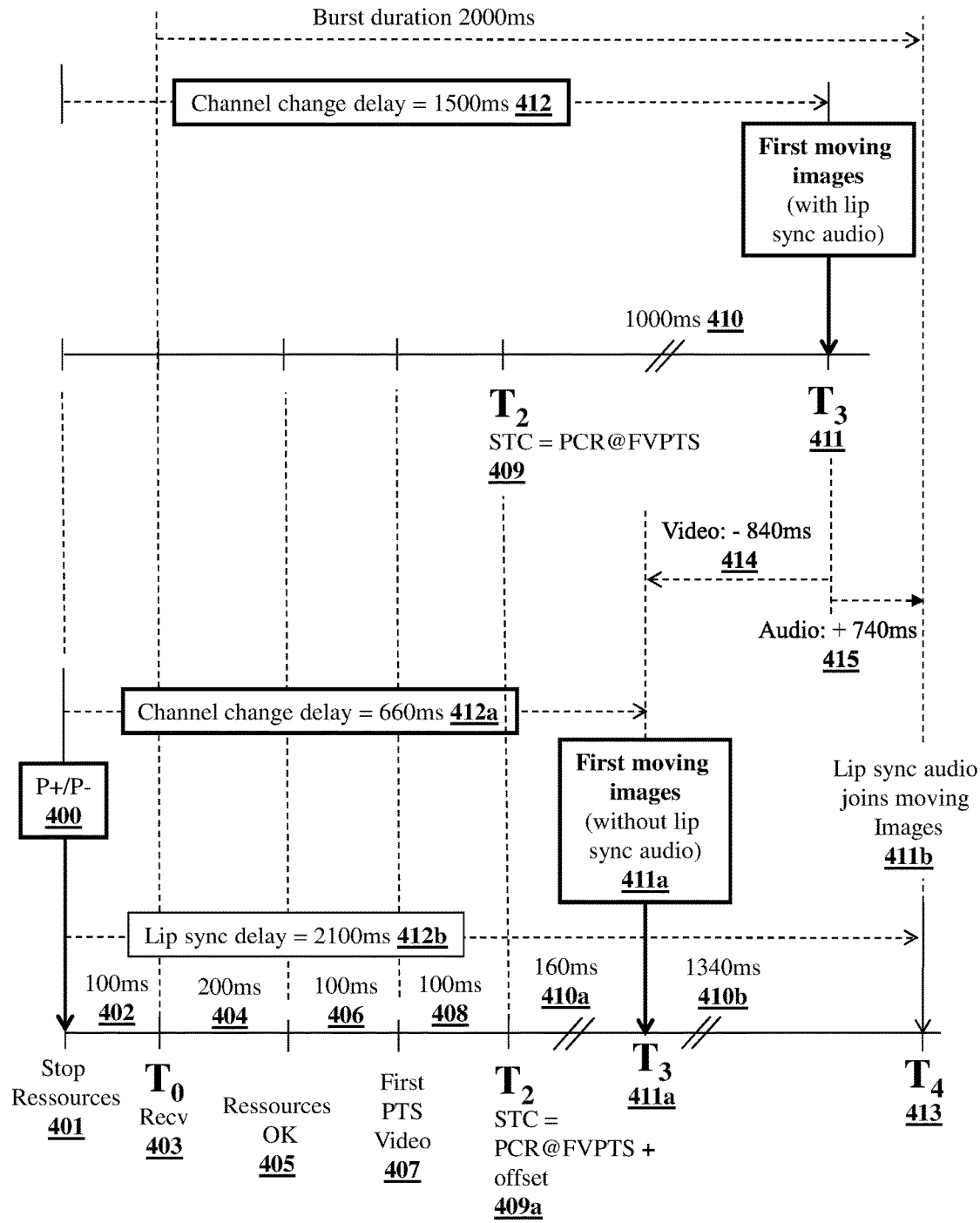
FIG. 4 is a timing diagram for fast channel change.

FIG. 4 is a timing diagram for fast channel change. The upper timeline is fast channel change as implemented for example by a prior technique AV receiver 12, 13 or 14 illustrated in FIG. 1, corresponding to an AV receiver 3 of FIG. 3, while the lower timeline is fast channel change as implemented by an AV receiver according to an embodiment of the present principles, such as AV receiver 5 of FIG. 5. The delay times in the figure are indicated for explanative purposes only and are coherent with burst characteristics as illustrated in FIG. 2.

In the prior technique AV receiver of which the timing diagram is shown in the upper part of FIG. 4, channel change delay as perceived by a user operating the AV receiver is about 1500 ms, reference 412. This channel change time as perceived by a user corresponds to the moment of receipt of a channel change command, reference 400, until a moment of rendering the first moving images (with lip synchronized audio), reference 411. Upon reception of a channel change command 400, the AV receiver's resources are stopped, reference 401, by an internal controller (not shown in FIG. 3; the internal controller is for example a microcontroller or a central processing unit); e.g. video decoding by decoder 34 and access control module (not shown in FIG. 3) are stopped, and a request for unicast burst transmission of a channel is transmitted to a fast channel change server (e.g. server 10 of FIG. 1) in parallel to or before transmission of a request to join a multicast transmission corresponding to the same channel. At $T_0$, reference 403, corresponding to 100 ms (reference 402) from reception of the channel change command 400, the AV receiver 3 receives the first data from the unicast transmission related to the requested channel and stores the data in the audio 31 and video 32 buffers. The video decoder 34 fetches data from the video buffer 32 when it is triggered by control signal 370. Two hundred milliseconds after receipt of the first data of the requested channel, reference 404, the AV receiver's resource initialization is completed, reference 405. One hundred milliseconds later, reference 406, a first video PTS is retrieved, reference 407, from video buffer 32 and is transmitted to video sync comparator 37. A first image retrieved by video decoder 34 from video buffer 32 can be decoded by decoder 34 and output on AV output 380 but will remain frozen until the video sync comparator 37 determines that the STC value 350 received from STC 35 has reached the value of the video PTS 321. One hundred milliseconds later, reference 408, the AV receiver's STC 35 is initialized with a value of a PCR received at the time of reception of a first video PTS, reference 409 ("PCR@FVPTS"), T2. PCRs are received frequently for example every 40 ms. PCR@FVPTS corresponds to the last PCR received in a window of a duration of, for example, 40 ms around the moment of reception of the first video PTS (FVPTS). The decoder will wait with decoding the video until lip sync audio can be provided with the video. Typically this is at about 1000 ms from T2 if the audio-video drift is 1000 ms, reference 410. The audio-video drift or AV drift is a gap between video frames and audio frames in a data transmission. At $T_3$, reference 411, one second, reference 410, from the initialization of the STC, the first moving images are rendered (with lip sync audio), reference 411. This results in a perceived channel change delay of about 1500 ms, reference 412, with the prior technique AV receiver.

In contrast with the prior technique AV receiver of which the channel change timing diagram is shown in the upper part of FIG. 4, the AV receiver according to the present principles, and of which the channel change diagram is shown in the lower part of FIG. 4, allows a considerable reduction of perceived channel change delay. The delays referenced by references 401 to 408 are the same as for the prior technique AV receiver. In contrast with the prior technique AV receiver, in the AV receiver according to the present principles the STC 35 is initialized at T2, reference 409a, with the value of PCR@FVPTS plus an offset value. This results in the first moving images at T3, reference 411a, i.e. video, being shown at about 160 ms, reference 410a, from T2, i.e. perceived channel change delay is 660 ms, reference 412a. At $T_4$, reference 413, lip sync audio joins the video after an additional delay of 1340 ms, reference 410b, from the rendering of first moving images. The first rendering of moving images is reduced from 1500 ms to 660 ms, reference 414, corresponding to a reduction of about 66%.

How this advantage is obtained is explained in the following.

A first case is considered wherein no burst is provided. It can be considered to start video decoding when the receiver is ready and when a first video PTS is received, in such a case, the STC would be initialized at T2 with the PTS@FVPTS. This is possible when there is no AV drift. When encoding audio/video data, audio frames may lag behind on video frames to which they relate. This lag between audio and video frames is referred to as audio-video drift or AV drift. Important AV drift may occur for example when a video sequence comprises a highly dynamic scene; in that case the video compression rate is low as there is low similarity between subsequent images, which results in long sequences of video packets coming from the encoder in which there is no or only a reduced space available for placing audio packets. In practice, a receiver can expect to receive audio/video streams with a maximum expected audio-video drift of 1000 ms. However, when the STC is initialized at T2 with PTS@FVPTS and there is AV drift, there is no opportunity to provide lip sync audio with the video, because there is no possibility for audio packets to catch up with the video packets. If lip sync audio is nevertheless to be provided, the video decoding should be slowed down, stopped, or video packets should be dropped to enable the audio to catch up with the video.

A second case is considered wherein a burst is provided. The burst delivers the audio/video packets with a rate that is higher than the rate with which the AV receiver consumes them. This procures an advantage in that the decoding can start earlier than in the first case where no burst is provided. In case of AV drift, the video decoding can still start earlier than in the case without burst, but two subcases are to be considered.

In a first subcase of the second case the AV drift is inferior or equal to the excess data duration. It is then possible to omit from delaying the starting of the video decoding with the value of the AV drift as the audio is guaranteed to catch up with the video before or at the end of the burst because of the excess data in the burst. Lip sync audio is ensured before or upon burst end. Thus, at T2 an offset is added to the STC that is equal to the value of the AV drift, having as an effect that the video decoding will start AV drift before the case without burst.

In a second subcase of the second case the AV drift is superior to the excess data duration. Now, the excess data in the burst can no longer compensate entirely the AV drift (it can only be compensated for the excess data duration), and lip sync audio is jeopardized if the offset to be added to the STC is computed as in the first subcase. To ensure lip sync audio, the moment of starting the video decoding as computed in the first subcase should thus be delayed with the duration of the AV drift that cannot be compensated by the excess data duration, i.e. with a value of AV_drift−excess_data_duration. Then, the offset to add to the STC at T2 is the offset as computed for the first subcase minus AV_drift−excess_data_duration, which results in offset=AV_drift−(AV_drift−excess_data_duration), which means that offset=excess_data_duration.

The above can be summarized by the following pseudo code:

If (AV_drift<excess_data_duration)

offset=AV_drift

Else offset=excess_data_duration    (4)

In the lower part of FIG. 4, receiver is ready to set the STC 35 at T2, reference 409a, that is 400 ms from T0, reference 403. Given the example burst characteristics of FIG. 2 and an example audio-video drift of 1000 ms, the application of (4) results in an offset of 840 ms. Setting the STC at this value at T2 results in first moving images being shown at 160 ms, reference 410a, at T3, reference 411a. Lip sync audio will join the video at T4, that is at the end of the burst, 1340 ms later. Video starts playing at T3, at 660 ms from the channel change command, which is 840 ms earlier, reference 414, than with the prior technique AV receiver for which the timing diagram is shown in the upper part of FIG. 4, while lip sync audio joins the video 740 ms later, reference 415, than with the prior technique AV receiver.

If the transmission environment is not controlled, the burst characteristics may be subject to variation. Variant embodiments take a variation of burst characteristics and/or audio-video drift into account and recompute the offset is regularly, or recomputed as these parameters change. Indeed, due to variating network bandwidth the straight line 224 of FIG. 2 may rather be a curved line. The excess data period 229 may be shorter or longer than expected. The excess bandwidth 230 may be higher or lower than expected. This may result in the excess data being sooner or later delivered than expected.

A first variant embodiment that takes into account a variation of burst characteristics comprises a monitoring of burst characteristics during AV reception. A first level of monitoring is done before the 411a point. Before this point any STC update has no visible or audible effect because the video has no motion yet and there is no audio rendering since audio is only rendered when lip sync is possible. During this period, if the result of monitoring of the burst characteristics is that they are other than expected, the offset can be recomputed and an update of the STC based on the recomputed offset can be made without any effect on audio/video rendering such as occurrences of a video freeze after the video starts and/or of an audio glitch. The consequence of the STC update due to the monitoring depends on the update value; T3, the point where video motion becomes visible (i.e. when the audio/video device outputs moving images), appears earlier or later than previously computed. For example, if monitoring of burst characteristics show that burst ratio is lower than expected, e.g. not 1.42 but 1.1, it follows that the burst_excess_data_duration is 282 ms instead of 592 ms. It follows from (4) that the STC is reinitialized with an offset of 400 ms instead of 840 ms, and video decoding will thus be starting 840−400=440 ms later than computed earlier. If on the contrary the burst ratio is higher than expected, the offset can be reduced, the STC is reinitialized whereby the offset is reduced and the moment of showing first moving images can be advanced compared to what was computed earlier. If the burst characteristics change, the offset is recomputed and STC is reinitialized accordingly.

Yet another variant embodiment takes into account variation of AV drift and comprises monitoring of AV drift characteristics and recomputing of offset according to (4), when AV_drift changes. AV_drift can be determined upon the reception of a video PTS; it is a difference between the video PTS and the last PCR received before the video PTS. If the AV drift changes, the offset is recomputed and the STC is reinitialized accordingly.

According to a variant embodiment, both burst characteristics and AV_drift are monitored to take into account variation of burst characteristics and/or AV_drift. If any of these change, the offset is recomputed and the STC is reinitialized accordingly.

According to a variant embodiment that can be combined with any of the above embodiments a second monitoring is done after the 411a point as a safety solution that ensures that all streams are synchronized at the expected lip sync point and thereby avoid that a channel change results in a video without lip sync audio. This variant embodiment is differentiated from the previous monitoring that was done before the 411a point in that a STC update will have an impact on at least the video rendering. This second monitoring can be implemented by a comparison, after $T_3$, between the last PCR received and the current STC value. If the STC is in advance, it has to be minored with the difference at least, which can result in visible artefacts (image freeze or to the contrary image jump).

According to a further variant embodiment of the monitoring of the burst characteristics (and possibly of the AV drift), the STC is slowed down after having set it at T2 based on the initially expected burst characteristics to ensure that video motion will occur in any case at an expected time. This may result in visible slowdown of video rendering. As an example, if the burst ratio is lower than expected, then the STC can be slowed down between T2 and T3, to be sure that PCR and STC will be at the same value and lip sync is possible at a pre-defined time T4. The slowdown factor is determined by the factor with which the burst ratio evolves; for example, if during the monitoring it is determined that the real burst ratio is 66% lower than expected, the STC clock speed can be set to 66% of normal speed. Once the lip sync point is reached, i.e. at T4, the STC clock speed is to be reset to its normal speed to display video in phase with audio and other streams (teletext, close caption/subtitles and so forth, if any).

Thus, according to the present principles video is shown early without audio and then joined later by lip sync audio.

Figure 5:
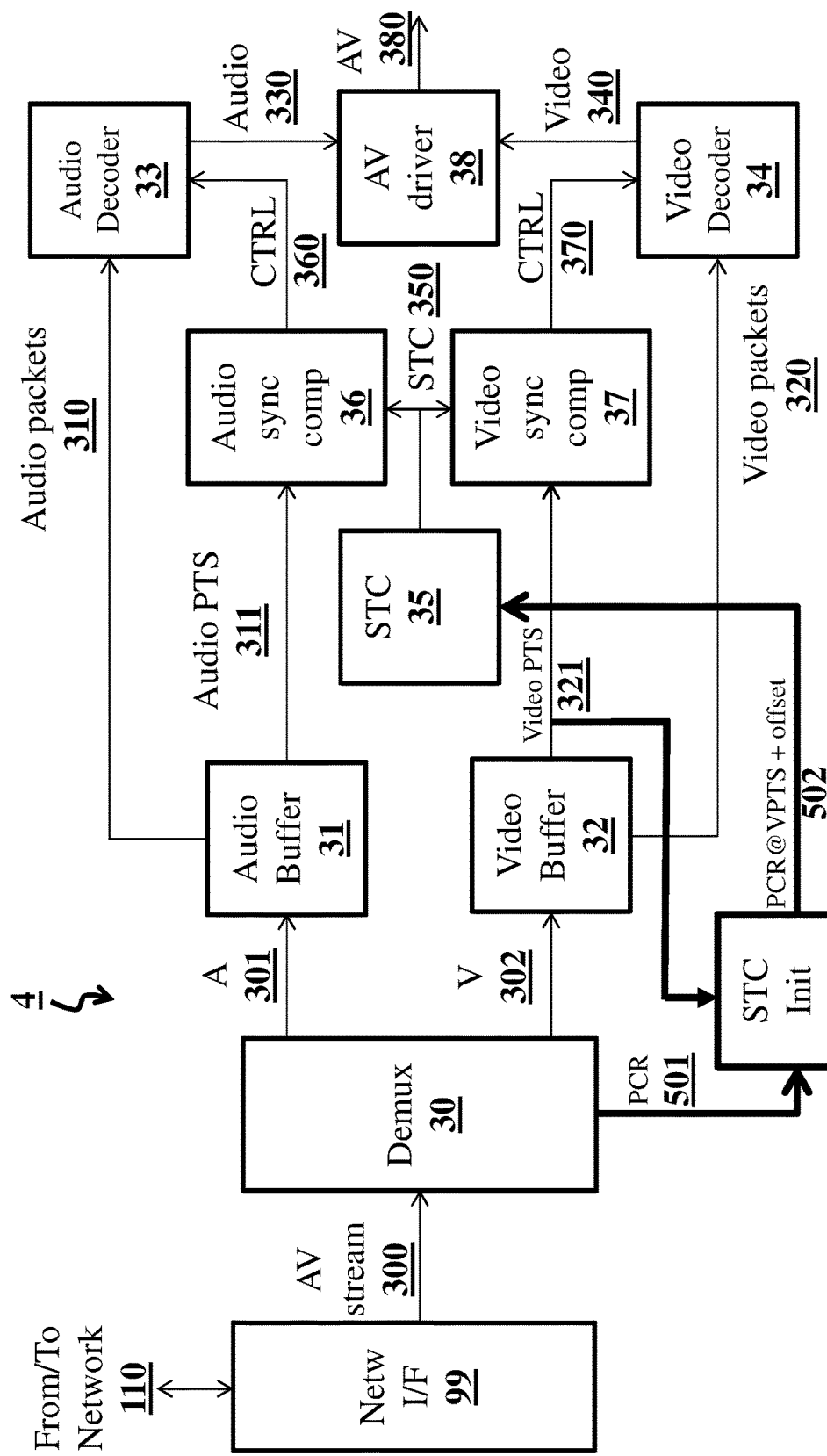
FIG. 5 is an IP AV receiver according to an embodiment of the present principles.

FIG. 5 is an IP AV receiver 5 according to an embodiment of the present principles. The IP AV receiver 5 comprises an STC initialization block 50, for initialization of STC according to the present principles. A PCR, reference 501, is received from demux 30. A video PTS 321 is received from video buffer 32. The STC 35 is initialized with a last PCR received before reception of a first video PTS plus an offset value (PCR@VPTS+offset), see reference 502, where the offset value is computed according to (4).

Figure 6:
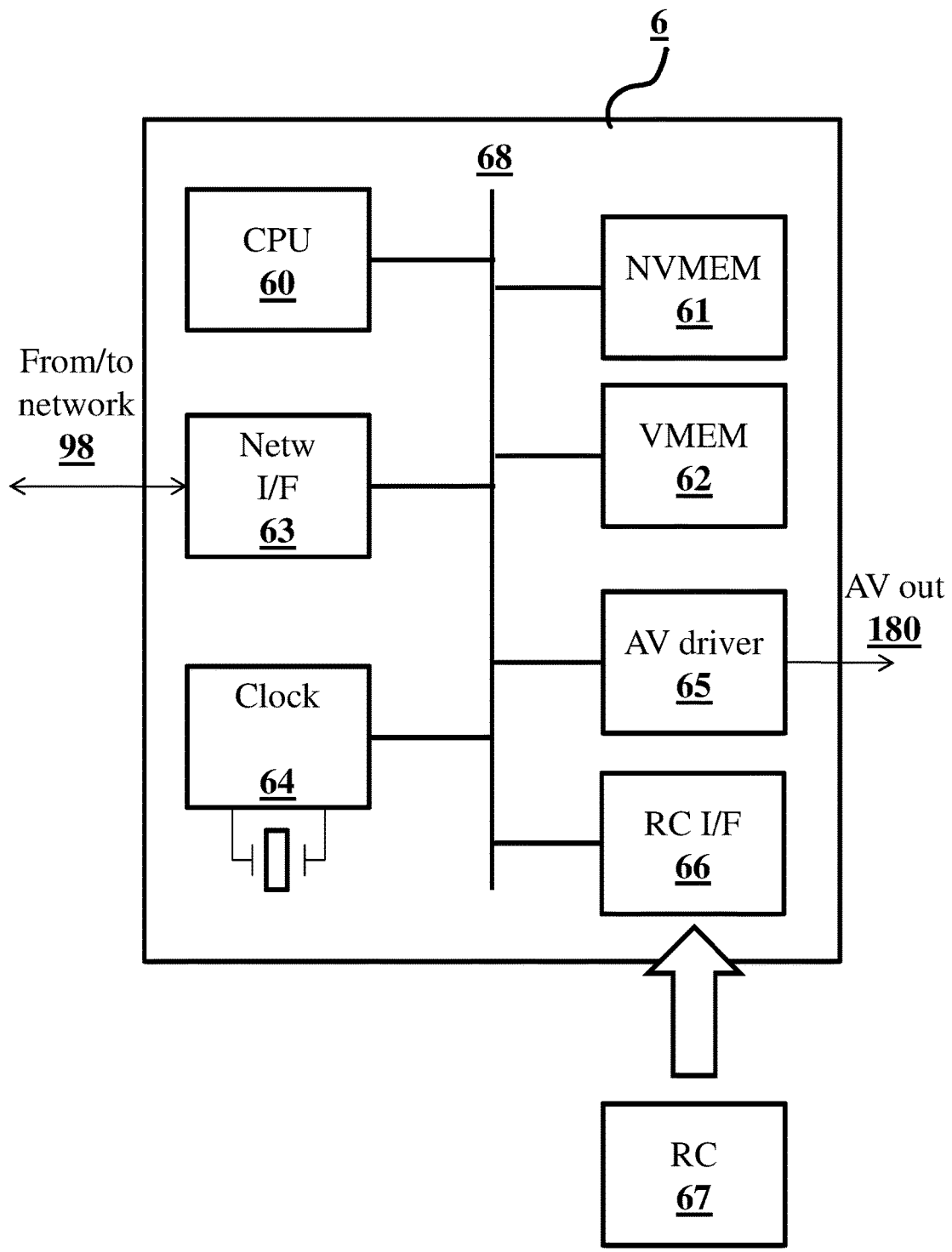
FIG. 6 is a variant embodiment of an audio/video receiver device according to the present principles.

FIG. 6 is a variant embodiment of an audio/video receiver device according to the present principles. The receiver comprises a network interface 63 connected to a network 98 and configured to transmit a request for burst reception of audio/video content from a selected video channel; a central processing unit 60 for computing and initializing a decoder clock in the audio/video receiver device with a value of a last Program Clock Reference received before receipt of a video Presentation Time Stamp plus an offset, wherein the offset is a function of a drift between audio and video frames in said burst and of a duration of excess data delivery of said burst reception; and the network interface 63 being further configured to switch to reception of audio/video content from a transmission at playout rate before end of said burst reception. The decoder clock is derived from clock unit 64. Video and audio are output on AV out 180 via AV driver 65. The device further comprises a non-volatile memory 61 for storage of instructions and data that can be read by processor 60, and a volatile memory 62 in which the processor can read/write data. User commands for example for channel change are received via remote control 67 and remote control interface 66. Elements 60-66 communicate over an internal data and communication bus 68.

Figure 7:
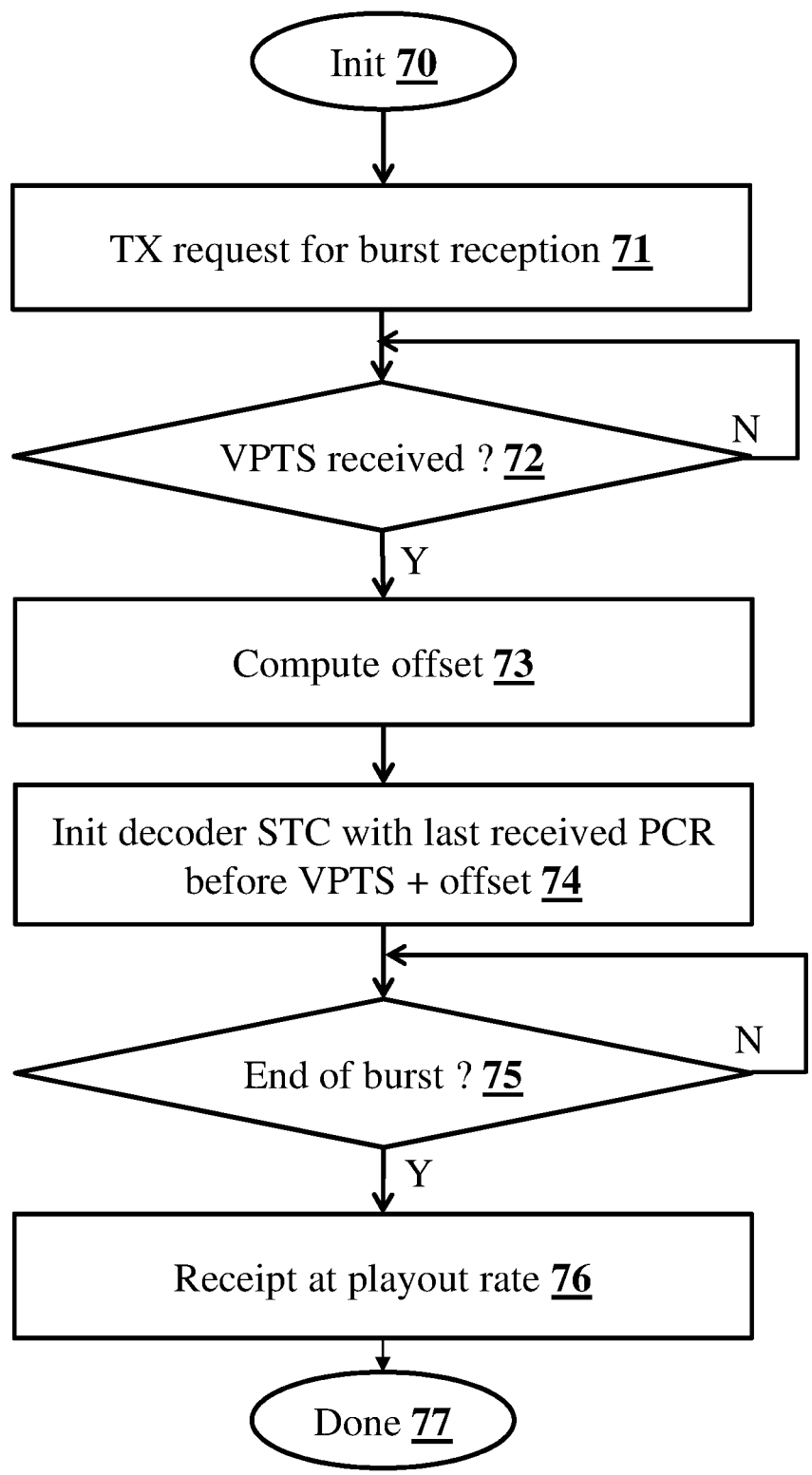
FIG. 7 is a flow chart of an embodiment of a method according to the present principles.

FIG. 7 is a flow chart of an embodiment of a method according to the present principles. In a first step 70, any variables and memory space are initialized that are used during execution of the method. In a step 71, a channel change command is received and a request for unicast burst reception of audio/video content from a selected audio/video channel is transmitted, e.g. to an FCC server. When a video PTS is received (reference 72), from the unicast burst, an offset is computed (reference 73) that is a function of the drift between video frames and corresponding audio frames (AV drift) in the unicast burst and of a duration of excess data delivery of the unicast burst reception. "corresponding audio frames" meaning here audio frames that are to be rendered in sync with video frames in order to be able to provide lip synchronization. The duration of the excess data delivery is the excess_data_duration as in (3). Then, in a step 74, the decoder's decoding clock (e.g. STC) is initialized with the value of the last PCR received before receipt of the video PTS plus the computed offset. A switch to a multicast transmission 76 of content of the selected channel is operated before or at end of the unicast burst reception 75, and the fast channel change is done (reference 77).

Although the previous example embodiments evoke unicast burst transmission and switchover to multicast transmission at playout rate which is particularly efficient in broadcast type transmissions, the present principles also apply to other audio/video stream delivery environments, such as for example PVR (Personal Video Recorder), or VoD (Video on Demand). In such environments, a video server can first transmit a requested audio/video stream in burst form and at burst end continue transmitting the requested audio/video stream at playout rate. In this case, there is no switch operated by the audio/video receiver device from a reception of audio/video data from, for example, a unicast burst transmission, to, for example, a multicast transmission at playout rate; a same audio/video server can manage the burst transmission as well as the transmission at playout rate.

According to the present principles video is shown early without audio and then joined later by lip sync audio.

Some elements in the drawings may not be used or be necessary in all embodiments. Some operations may be executed in parallel. Variant embodiments other than those illustrated and/or described are possible.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized.

Thus, for example, it will be appreciated by those skilled in the art that the diagrams presented herein represent conceptual views of illustrative system components and/or circuitry embodying the principles of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for fast channel change of an audio/video receiver device receiving an audio/video stream over an Internet Protocol network, wherein the method is implemented by said audio/video receiver device, the method comprising:

receiving a channel change command;

transmitting a request for burst delivery of said audio/video stream corresponding to a new channel;

initializing a decoder clock in said audio/video receiver device with a value of a last Program Clock Reference comprised in said burst delivery before receipt of a video Presentation Time Stamp comprised in said burst delivery plus an offset, wherein said offset is a function of a drift between video frames and corresponding audio frames in said burst and of a duration of excess data delivery of said burst delivery defined as a duration of a part of said burst delivery during which data is received in excess compared to a delivery at playout rate; and receiving said audio/video stream at said playout rate after end of said burst delivery.

2. The method according to claim 1, wherein said drift is a difference between said video Presentation Time Stamp and said last Program Clock Reference.

3. The method according to claim 1, wherein said offset is equal to said drift if said difference is inferior to said duration of excess data delivery of said burst delivery and wherein said offset is said duration of excess data delivery otherwise.

4. The method according to claim 1, further comprising:
monitoring said drift between audio and video frames; and
if said drift between audio and video frames changes, reinitializing said decoder clock based on said change in drift between audio and video frames.

5. The method according to claim 1, further comprising:
monitoring burst characteristics; and
if said burst characteristics change, reinitializing said decoder clock based on said changed burst characteristics.

6. The method according to claim 1, further comprising monitoring of said drift between audio and video frames and monitoring of burst characteristics, and reinitializing said decoder clock if said drift or said burst characteristics change, based on said changed drift or based on said changed burst characteristics.

7. The method according to claim 4, wherein said reinitialization of said decoder clock is done before appearance of moving images are output by said audio/video receiver device.

8. The method according to claim 1, wherein said decoder clock is a System Time Clock.

9. An audio/video receiver device comprising:
an interface configured to receive a channel change command;
a network interface configured to transmit a request for burst delivery of audio/video content from a selected audio/video channel; and
a processor and a memory configured to initialize a decoder clock of the audio/video receiver device with a value of a last program clock reference received before receipt of a video presentation time stamp plus an offset, wherein said offset is a function of a drift between audio and video frames in a burst delivery and of a duration of excess data delivery of said burst delivery defined as a duration of a part of said burst delivery during which data is received in excess compared to a delivery at playout rate; and said network interface being further configured to switch to reception of audio/video content from a transmission at playout rate before end of said burst delivery.

10. The audio/video receiver device according to claim 9, wherein said processor is further configured to compute said drift as a difference between said video Presentation Time Stamp and said last Program Clock Reference.

11. The audio/video receiver device according to claim 9, wherein said processor is further configured to compute said offset as being equal to said drift if said difference is inferior to said duration of excess data delivery of said burst reception and wherein said offset is said duration of excess data delivery otherwise.

12. The audio/video receiver device according to claim 9, wherein said processor is further configured to:
monitor said drift between audio and video frames; and
if said drift between audio and video frames changes, reinitialize said decoder clock based on said change in drift between audio and video frames.

13. The audio/video receiver device according to claim 9, wherein said processor is further configured to:
monitor burst characteristics; and
if said burst characteristics change, reinitialize said decoder clock based on said changed burst characteristics.

14. The audio/video receiver device according to claim 9, wherein said processor is further configured to monitor said drift between audio and video frames and to monitor burst characteristics, and to reinitialize said decoder clock if said drift or said burst characteristics change, based on said changed drift or based on said changed burst characteristics.

15. The audio/video receiver device according to claim 12, wherein said processor is further configured to reinitialize said decoder clock before appearance of moving images are output by said audio/video receiver device.

16. The audio/video receiver device according to claim 9, wherein said decoder clock is a System Time Clock.

* * * * *